(12) United States Patent
Breznova et al.

(10) Patent No.: US 7,768,773 B2
(45) Date of Patent: Aug. 3, 2010

(54) SINTERED ANODE PELLET ETCHED WITH AN ORGANIC ACID FOR USE IN AN ELECTROLYTIC CAPACITOR

(75) Inventors: Hana Breznova, Vsetin (CZ); Martin Biler, Novy Jicin (CZ)

(73) Assignee: AVX Corporation, Myrtle Beach, SC (US)

( * ) Notice: Subject to any disclaimer, the term of this patent is extended or adjusted under 35 U.S.C. 154(b) by 235 days.

(21) Appl. No.: 12/017,473

(22) Filed: Jan. 22, 2008

(65) Prior Publication Data

US 2009/0185330 A1 Jul. 23, 2009

(51) Int. Cl.
*H01G 9/00* (2006.01)
*H01G 9/04* (2006.01)
*H01G 9/145* (2006.01)

(52) U.S. Cl. .................................. 361/528; 29/25.03
(58) Field of Classification Search .................. 361/528, 361/529, 532
See application file for complete search history.

(56) References Cited

U.S. PATENT DOCUMENTS

| | | | |
|---|---|---|---|
| 3,345,545 A | 10/1967 | Bourgault et al. |
| 4,084,965 A | 4/1978 | Fry |
| 4,085,435 A | 4/1978 | Galvagni |
| 4,118,727 A | 10/1978 | Laplante |
| 4,131,520 A | 12/1978 | Bernard et al. |
| 4,149,876 A | 4/1979 | Rerat |
| 4,155,017 A | 5/1979 | Gaule et al. |
| 4,278,513 A | 7/1981 | Millard et al. |
| 4,412,902 A | 11/1983 | Michikami et al. |
| 4,672,267 A | 6/1987 | Lapatovich et al. |
| 4,712,857 A | 12/1987 | Lee |
| 4,722,756 A | 2/1988 | Hard |
| 4,892,862 A | 1/1990 | Ogushi et al. |
| 4,945,452 A | 7/1990 | Sturmer et al. |
| 4,957,541 A | 9/1990 | Tripp et al. |
| 5,098,485 A | 3/1992 | Evans |
| 5,198,187 A | 3/1993 | Lu et al. |
| 5,198,968 A | 3/1993 | Galvagni |
| 5,306,479 A | 4/1994 | Sommers |

(Continued)

FOREIGN PATENT DOCUMENTS

CN 1549286 11/2004

(Continued)

OTHER PUBLICATIONS

UK Search Report for GB0821004.9 dated Feb. 24, 2009, 3 pages.

(Continued)

*Primary Examiner*—Eric Thomas
(74) *Attorney, Agent, or Firm*—Dority & Manning, P.A.

(57) ABSTRACT

An electrolytic capacitor anode etched with an organic acid prior to anodic oxidation of the anode to create the dielectric layer. Without intending to be limited by theory, it is believed that the organic acid can etch away at least a portion of any oxides on the anode. This provides a relatively uniform surface for the creation of the dielectric, which in turn leads to a dielectric layer having a substantially uniform thickness and homogeneous amorphous structure and thus improved leakage current and stability. The organic acid may also have other residual benefits, such as removing any metallic impurities from the surface of the anode.

30 Claims, 9 Drawing Sheets

U.S. PATENT DOCUMENTS

| | | | |
|---|---|---|---|
| 5,357,399 | A | 10/1994 | Salisbury |
| 5,391,269 | A * | 2/1995 | Fiering et al. ............... 29/854 |
| 5,394,295 | A | 2/1995 | Galvagni et al. |
| 5,457,862 | A | 10/1995 | Sakata et al. |
| 5,473,503 | A | 12/1995 | Sakata et al. |
| 5,495,386 | A | 2/1996 | Kulkarni |
| 5,729,428 | A | 3/1998 | Sakata et al. |
| 5,812,367 | A | 9/1998 | Kudoh et al. |
| 5,949,639 | A | 9/1999 | Maeda et al. |
| 5,993,513 | A | 11/1999 | Fife |
| 6,051,044 | A | 4/2000 | Fife |
| 6,072,694 | A | 6/2000 | Hahn et al. |
| 6,115,235 | A | 9/2000 | Naito |
| 6,165,623 | A | 12/2000 | Fife et al. |
| 6,191,936 | B1 | 2/2001 | Webber et al. |
| 6,197,252 | B1 | 3/2001 | Bishop et al. |
| 6,312,642 | B1 | 11/2001 | Fife |
| 6,322,912 | B1 | 11/2001 | Fife |
| 6,334,945 | B1 | 1/2002 | Lessner et al. |
| 6,338,816 | B1 | 1/2002 | Fife |
| 6,373,685 | B1 | 4/2002 | Kimmel et al. |
| 6,375,704 | B1 | 4/2002 | Habecker et al. |
| 6,391,275 | B1 | 5/2002 | Fife |
| 6,402,066 | B1 | 6/2002 | Habecker et al. |
| 6,416,730 | B1 | 7/2002 | Fife |
| 6,420,043 | B1 | 7/2002 | Fife et al. |
| 6,455,443 | B1 | 9/2002 | Eckert et al. |
| 6,462,934 | B2 | 10/2002 | Kimmel et al. |
| 6,517,645 | B2 | 2/2003 | Fife |
| 6,522,527 | B2 | 2/2003 | Kojima et al. |
| 6,527,937 | B2 | 3/2003 | Fife |
| 6,563,695 | B1 | 5/2003 | Suzuki et al. |
| 6,576,099 | B2 | 6/2003 | Kimmel et al. |
| 6,592,740 | B2 | 7/2003 | Fife |
| 6,616,728 | B2 | 9/2003 | Fife |
| 6,639,787 | B2 | 10/2003 | Kimmel et al. |
| 6,674,635 | B1 | 1/2004 | Fife et al. |
| 6,702,869 | B2 | 3/2004 | Habecker et al. |
| 6,706,240 | B2 | 3/2004 | Habecker et al. |
| 6,759,026 | B2 | 7/2004 | Kimmel et al. |
| 6,821,314 | B1 | 11/2004 | Reichert et al. |
| 6,835,225 | B2 | 12/2004 | Naito et al. |
| 7,025,795 | B2 | 4/2006 | Monden et al. |
| 7,116,548 | B2 | 10/2006 | Satterfield, Jr. et al. |
| 7,149,074 | B2 | 12/2006 | Kimmel et al. |
| 7,156,893 | B2 | 1/2007 | Habecker et al. |
| 7,157,073 | B2 | 1/2007 | Motchenbacher et al. |
| 7,220,397 | B2 | 5/2007 | Kimmel et al. |
| 7,241,436 | B2 | 7/2007 | Fife |
| 7,262,511 | B2 | 8/2007 | Osako et al. |
| 2003/0104923 | A1* | 6/2003 | Omori et al. ............... 501/134 |
| 2005/0013765 | A1 | 1/2005 | Thomas et al. |
| 2005/0019581 | A1 | 1/2005 | Schnitter |
| 2005/0103638 | A1 | 5/2005 | Schnitter et al. |
| 2005/0150576 | A1 | 7/2005 | Venigalla |
| 2005/0199321 | A1 | 9/2005 | Spaniol |
| 2006/0046417 | A1* | 3/2006 | Kobayashi et al. ........ 438/381 |
| 2006/0146481 | A1* | 7/2006 | Naito et al. ............... 361/528 |
| 2007/0072362 | A1 | 3/2007 | Tseng et al. |
| 2007/0121276 | A1 | 5/2007 | Uzawa et al. |
| 2007/0137434 | A1* | 6/2007 | Omori et al. ............... 75/244 |

FOREIGN PATENT DOCUMENTS

| | | |
|---|---|---|
| EP | 1591564 A2 | 11/2005 |
| EP | 1591564 A3 | 11/2005 |
| EP | 1826297 A2 | 8/2007 |
| GB | 2371811 A | 8/2002 |
| JP | 62268121 A | 11/1987 |
| JP | 9306792 A | 11/1997 |
| SU | 1057995 A | 11/1983 |
| WO | WO 9738143 A1 | 10/1997 |
| WO | WO 9819811 A1 | 5/1998 |
| WO | WO 9838660 A1 | 9/1998 |
| WO | WO 060620 A1 | 10/2000 |
| WO | WO 2005017929 A1 | 2/2005 |
| WO | WO 2005076297 A1 | 8/2005 |
| WO | WO 2006054795 A1 | 5/2006 |
| WO | WO 2007020458 A1 | 2/2007 |
| WO | WO 2007020464 A1 | 2/2007 |
| WO | WO 2007026165 A1 | 3/2007 |
| WO | WO 2008151044 A2 | 12/2008 |
| WO | WO 2008151044 A3 | 12/2008 |

OTHER PUBLICATIONS

Abstract of Canadian Patent No. CA 2 018 346 dated Dec. 8, 1990.
Abstract of Japanese Patent No. JP1176226 dated Jul. 12, 1989.
Abstract of Japanese Patent No. JP2038501 dated Feb. 7, 1990.
Abstract of Japanese Patent No. JP3023222 dated Jan. 31, 1991.
Abstract of Japanese Patent No. JP4070594 dated Mar. 5, 1992.
*Adsorption of Gases in Multimolecular Layers*, Brunauer et al., The Journal of the American Chemical Society, vol. 60, Feb. 1938, pp. 309-319.
*Change in Porous Structure and Leakage Currents of Niobium Capacitor Anodes During Electrolytic Oxidation*, Levinskiy, et al., Poroshkovaya Metallurgiya, No. e, 1991, pp. 56-59.
*Charge Carrier Transport and Storage in NbO Capacitors*, Sikula et al., CARTS Europe, Oct. 21, 2004, 4 pages.
*Conductivity Mechanisms and Breakdown Characteristics of Niobium Oxide Capacitors*, Hlavka et al., AVX Corporation 2003, 5 pages.
*Conductivity Mechanisms and Breakdown of NbO Capacitors*, Hlavka et al., CARTS USA, Mar. 19, 2004, 7 pages.
*Dynamic Phenomena in Superconducting Oxides Measured by ESR*, Acrivos et al., Physical Review B, vol. 50, No. 18, Nov. 1, 1994, pp. 13.710-13.723.
*Dynamics of Flux Motion Observed by ESR in Superconducting Oxides*, Acrivos et al., Physics C 235-240, 1994, pp. 3159-3160.
*Electrical Conductivity in Ceramics and Glass*, Vest et al., Department of the Air Force, Aerospace Research Laboratories, Wright-Patterson Air Force Base, OH., 1974, pp. 375-384.
*Electrochemical characterization of a polypyrrole/$Co_{0.2}CrO_x$ composite as a cathode material for lithium ion batteries*, Ramasamy et al., Journal of Power sources 124, 2003, pp. 197-203.
*Electrolytic Capacitors*, Electrochemical Society Reviews and News, vol. 24, No. 12, Dec. 1977, pp. 408C-409-C.
Encyclopedia of Chemical Technology entitled *Nickel and Nickel Alloys to Paint*, vol. 17, $4^{th}$ Edition, pp. 59 and 65-66, no date.
*Extended Range NbO Capacitors Through Technology and Materials Enhancements*, Zednicek, et al., CARTS USA, Mar. 24, 2005, 5 pages.
*General Characteristics of the Film-Forming Metals: The Relation Between Overpotential and the Fields in the Oxide and Across the Interfaces*, Young, Chapter 2, pp. 4-5, no date.
*Growth of thin-film niobium oxide layers by molecular-beam epitaxy*, Petrucci et al., J. Appl. Phys. 63(3), Feb. 1, 1988, pp. 900-909.
*Heat Field Stability and Crystallization Peculiarities of Amorphous $Nb_2O_5$ Films*, Palatnik et al., Fizika I Khimiya Obrabotki Materialov, No. 5, 1982, pp. 87-94.
*High-Capacitance Supercapacitor Using a Nanocomposite Electrode of Single-Walled Carbon Nanotube and Polypyrrole*, An et al., Journal of The Electrochemical Society, vol. 149, No. 8, 2002, pp. A1058-A1062.
*Investigation of Columbium as an Electrolytic Capacitor Anode, Part II*, Peabody, U.S. Army Signal Research and Development Laboratory, Fort Monmouth, NJ, DA Task Nr. 3a99-15-003-04, 1962, pp. 1-11.
*Low ESR and Low Profile Technology on Niobium Oxide*, Zednicek et al., AVX Corporation 2003, 9 pages.
*Mechanism of leakage current reduction of tantalum oxide capacitors by titanium doping*, Lau et al., Applied Physics Letters 90, 2007, pp. 112903-1-112903-3.

*NbO Capacitor Parameters Improvement, Leakage Current Mechanism and Anodic Oxidation*, Šikula et al., Mar. 30, 2005, 7 pages.
*New Tantalum Technologies, Tantalum Polymer, and Niobium Oxide Capacitors*, T. Zedniček, CARTS Europe Prague, Oct. 19, 2005, 7 pages.
*Niobium Compounds and Alloys*, J. Eckert, Int. J. of Refractory Metals & Hard Materials, vol. 12, 1993-1994, pp. 335-340.
*Niobium Oxide and Tantalum Capacitors: M-I-S Model Parameters Comparison*, Sikula et al., CARTS USA, Mar. 24, 2005, 4 pages.
*Niobium Oxide set to beat the pants off tants*, CIE (Components in Electronics), Aug. 2007.
*Niobium Oxide Technology Roadmap*, Zednicek et al., AVX Corporation, T. Zednicek et al., CARTS Europe Nice, Oct. 15, 2002, 5 pages.
*Niobium Physico-Chemical Properties of Its Compounds and Alloys*, Feschotte et al., International Atomic Energy Review, Special Issue No. 2, 1968, pp. 56-59.
*Niobium Solid Electrolytic Capacitors*, Schwartz et al., Journal of the Electrochemical Society, vol. 108, No. 8, Aug. 1961, pp. 750-757.
*Note on the Crystal Structure of Niobium Dioxide*, Magneli et al., Acta Chem. Scand. 9, No. 8, 1955.
*Oxidative coupling of methane over NbO (p-type) and $Nb_2O_5$ (n-type) semiconductor materials*, Erarslanoglu et al., Catalysis Letters 38, 1996, pp. 215-218.
*Phosphoric Acid Passivated Niobium and Tantalum EIS-Comparative Study*, Al-Kharafi et al., Electrochimica Acta, vol. 40, No. 16, 1995, pp. 2623-2626.
*Preparation and Chlorination of $NbO_2$ and NbO and NbC*, Baba et al., Journal of Mining and Metallurgical Inst. of Japan, vol. 82, No. 942, 1966, pp. 855-860.
*Quality of Niobium Oxide Semiconductor Capacitors as a Function of Chemical Composition of the Niobium Powder*, Bord et al., No. 1 (46), 1982, pp. 11-15.
*Study of NbO by neutron diffraction of inelastic scattering of neutrons*, V. V. Sumin, Sov. Phys. Crystallogr. 34(3), May-Jun. 1989, pp. 391-393.
*Study of Oxygen Solubility in Niobium*, Orlov et al., Izvestiya Akademii Nauk SSSR, Metally, No. 5, 1985, pp. 202-205.
*Superconductivity in the System Ln-Sr-Nb-O (Ln=La, Nd, Gd, Dy, Tm, Lu)*, Kuz'micheva et al., Russian Journal of Inorganic Chemistry, vol. 38, No. 1, 1993, pp. 149-153.

*The crystal structure of niobium monoxide*, Bowman et al., Los Alamos Scientific Laboratory, University of California, Los Alamos, NM, Jun. 4, 1966.
*The Formation of the Lower Oxides of Niobium and Tantalum in Some Reactions of Reduction and Oxidation*, Lapitskii et al., Zhurnal Neorganischeskoi Khimii (Journal of Inorganic Chemistry, USSR), vol. II, No. 1, 1957, pp. 80-91.
*The Influence of Gas Atmospheres on the First Stage Sintering of High Purity Niobium Powders*, Krehl et al., Metallurgical Transactions, vol. 15A, Jun. 1984, pp. 1111-1116.
*The Microstructure of Slightly Substoichiometric $NbO_1$*, Gannon et al, Journal of Solid State Chemistry, vol. 20, 1977, pp. 331-344.
*The Oxides of Niobium*, Georg Bauer, Zeitschrift fuer anorganische und allgemeine Chemie, vol. 248, No. 1, Sep. 12, 1941, pp. 1-31.
*The Stabilization of Niobium-Based Solid Electrolyte Capacitors*, Qiu et al., Active and Passive Elec. Comp., vol. 25, 2002, pp. 201-209.
*The Use of Niobium as an Anode Material in Liquid Filled Electrolytic Capacitors*, Jackson et al., Electrocomponent Science and Technology, vol. 1, 1974, pp. 27-37.
*Transport and Noise Characteristics of Niobium Oxide and Tantalum Capacitors*, Sikula et al., 4 pages, no date.
Catalog—Alfa Æsar—The Right Chemicals/The Right Chemistry, 1995-1996, 1 page.
Chapter entitled *The Lower Oxides of Columbium* by Mellor from A Comprehensive Treatise on Inorganic and Theoretical Chemistry, vol. IX, 1923, pp. 856-857.
Chemical Structure of gamma-Glycidoxypropyltrimethoxysilane from Si Power Chemical Corporation-SiSiB® Silane Coupling Agent, SiSiB® PC3100, no date.
Form—Related U.S. Patent Applications.
Material Safety Data Sheet for Niobium Oxide, Jun. 1994, ESPI Metals.
Technical Report—*Niobium Solid Electrolytic Capacitors*, Mifune et al., National Technical Report 9, 1963, 17 pages.
Translation of SU 1,556,420 entitled *Material for Anodes of Electrolytic and Oxide-Semiconductor Capacitors*, by Yelyutin et al., Jul. 28, 1987.
Z. anorg. Allg. Chemie, vol. 317, 1962, pp. 321-333.

* cited by examiner

SINTERED ANODE PELLET ETCHED WITH AN ORGANIC ACID FOR USE IN AN ELECTROLYTIC CAPACITOR

BACKGROUND OF THE INVENTION

Electrolytic capacitors are often formed from valve action materials that are capable of being oxidized to form a dielectric layer. Typical valve action metals are niobium and tantalum. More recently, capacitors have been developed that employ an anode made from an electrically conductive oxide of niobium and a niobium pentoxide dielectric. Niobium oxide based capacitors have significant advantages over tantalum capacitors. For example, niobium oxide is more widely available and potentially less expensive to process than tantalum. Niobium oxide capacitors are also more stable against further oxidation and thus less prone to thermal runaway when over-voltaged (or otherwise over-loaded) than tantalum and niobium. Further, niobium oxide has several orders of magnitude lower minimum ignition energy compared to niobium and tantalum. Niobium oxide capacitors may also have a unique high resistance failure mechanism that limits the leakage current to a level below the capacitor's thermal runaway point. In niobium oxide capacitors, for instance, a passive crystalline $NbO_2$ or $Nb_2O_5$ film may form upon contact with the atmosphere after sintering of the NbO anode. Such passive films or other impurities can act as a nucleus and give rise to more conductive crystalline $Nb_2O_5$ in the subsequent anodically grown dielectric film. This may lead to leakage current instability at accelerated temperature and voltage load.

As such, a need currently exists for an electrolytic capacitor anode having a reduced number of defects in the dielectric layer.

SUMMARY OF THE INVENTION

In accordance with one embodiment of the present invention, a method for forming an anode of an electrolytic capacitor is disclosed. The method comprises compacting a powder that contains a valve metal composition into a pressed pellet; sintering the pressed pellet to form an anode body; etching the anode body with an organic acid; and thereafter, anodically oxidizing the etched anode body in the presence of an electrolyte to form a dielectric layer.

In accordance with another embodiment of the present invention, a solid electrolytic capacitor is disclosed that comprises a sintered, pressed anode pellet containing tantalum, niobium, or an electrically conductive oxide thereof. The pellet possesses a surface etched with an organic acid. The capacitor further comprises a dielectric layer overlying the etched surface of the pellet and a solid electrolyte layer overlying the dielectric layer.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
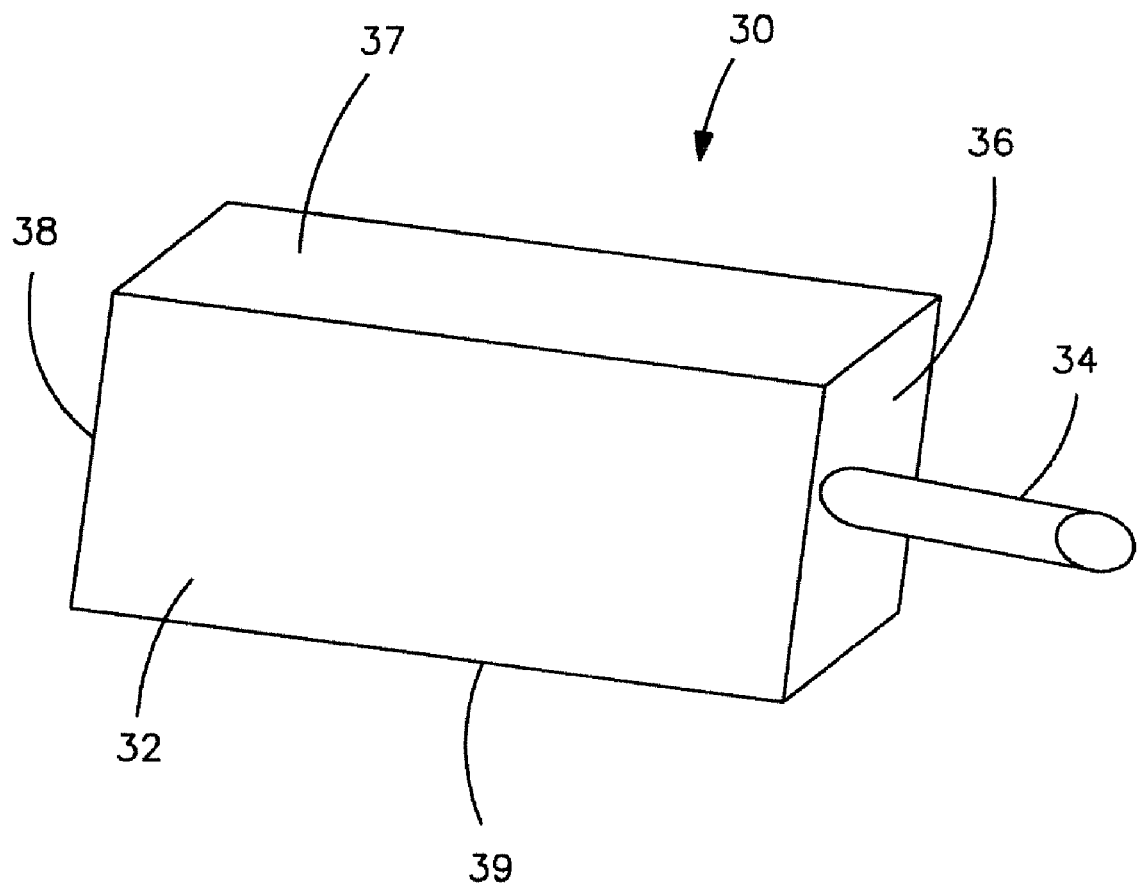
FIG. 1 is a perspective view of one embodiment of an electrolytic capacitor of the present invention.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to an electrolytic capacitor anode etched with an organic acid prior to anodic oxidation of the anode to create the dielectric layer. Without intending to be limited by theory, it is believed that certain organic acids can etch away at least a portion of any oxides on the anode. This provides a relatively uniform surface for the creation of the dielectric, which in turn leads to a dielectric layer having a substantially uniform thickness and homogeneous amorphous structure and thus improved leakage current and stability. The organic acid may also have other residual benefits, such as removing any metallic impurities from the surface of the anode.

The organic acid employed in the present invention is generally "weak" in that it has a first acid dissociation constant ($pK_{a1}$) of about 0 to about 11, in some embodiments about 1 to about 10, and in some embodiments, from about 2 to about 10, determined at 25° C. Any suitable weak organic acid may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, mesotartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; phenols, such as pyrogallol (benzene-1,2,3-triol), pyrocatechol (benezenediol), etc.; blends thereof, and so forth. Polyprotic acids (e.g., diprotic, triprotic, etc.) are particularly desirable, such as α-tartaric acid ($pK_{a1}$ of 2.98 and $pK_{a2}$ of 4.34), mesotartaric acid ($pK_{a1}$ of 3.22 and $pK_{a2}$ of 4.82), oxalic acid ($pK_{a1}$ of 1.23 and $pK_{a2}$ of 4.19), citric acid ($pK_{a1}$ of 3.13, $pK_{a2}$ of 4.76, and $pK_{a3}$ of 6.40), etc.

The anode is generally formed from a powder having a specific charge of about 25,000 microFarads*Volts per gram ("µF*V/g") or more, in some embodiments about 40,000 µF*V/g or more, in some embodiments about 60,000 µF*V/g or more, and in some embodiments, from about 80,000 to about 200,000 µF*V/g or more. The powder contains a valve-metal composition that includes a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even while sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

The particles used to form the powder may possess any desired shape or size. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 grams per cubic centimeter ($g/cm^3$), in some embodiments from about 0.2 to about 2.5 $g/cm^3$, and in some embodiments, from about 0.5 to about 1.5 $g/cm^3$.

To facilitate formation of the anode, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, napthaline, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

Once formed, the resulting powder is compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode wire (e.g., tantalum wire). It should be further appreciated that the anode wire may alternatively be attached (e.g., welded) to the anode body subsequent to pressing and/or sintering of the anode body. After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum. Upon sintering, the pellet shrinks due to the growth of bonds between the particles. In addition to the techniques described above, any other technique for forming the anode body may also be utilized in accordance with the present invention, such as described in U.S. Pat. No. 4,085,435 to Galvagni; U.S. Pat. No. 4,945,452 to Sturmer, et al.; U.S. Pat. No. 5,198,968 to Galvagni; U.S. Pat. No. 5,357,399 to Salisbury; U.S. Pat. No. 5,394,295 to Galvagni, et al.; U.S. Pat. No. 5,495,386 to Kulkarni; and U.S. Pat. No. 6,322,912 to Fife, which are incorporated herein in their entirety by reference thereto for all purposes.

Although not required, the thickness of the anode may be selected to improve the electrical performance of the capacitor. For example, the thickness of the anode may be about 4 millimeters or less, in some embodiments, from about 0.2 to about 3 millimeters, and in some embodiments, from about 0.4 to about 1 millimeter. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Once formed, the anode body is etched with the organic acid of the present invention to remove oxides incurred during and/or after sintering. Typically, the organic acid is applied to the anode body in the form of an etching solution using any known technique, such as dipping, printing, spraying, powder coating, and so forth. The etching solution typically contains a solvent, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. Although not necessarily required, aqueous solvents (e.g., water) are often employed. In fact, water may constitute about 1 wt. % or more, in some embodiments about 10 wt. % or more, in some embodiments about 50 wt. % or more, in some embodiments about 70 wt. % or more, and in some embodiments, about 90 wt. % to 100 wt. % of the solvent(s) used in the electrolyte.

If desired, certain parameters of the etching solution may be selected to facilitate dissociation of the acid, thereby allowing it to more readily react with oxides on the anode surface. Higher pH values (e.g., above 7) and higher temperatures, for example, tend to favor an increase in acid dissociation. However, too high of a pH value and too high of a temperature may cause unwanted corrosion of the anode. Thus, the pH of the etching solution is typically controlled within the range of about 2 to about 12, and in some embodiments, from about 3 to about 11, and in some embodiments, from about 4 to about 8. To achieve the desired pH, the organic acid typically constitutes from about 0.1 wt. % to about 20 wt. %, in some embodiments from about 0.5 wt. % to about 10 wt. %, and in some embodiments, from about 1 wt. % to about 5 wt. % of the etching solution. Solvents may likewise constitute from about 80 wt. % to about 99.9 wt. %, in some embodiments from about 90 wt. % to about 99.5 wt. %, and in some embodiments, from about 95 wt. % to about 99 wt. % of the etching solution. Of course, it should be understood that conventional pH adjusters (acidic or basic) may also be employed in the etching solution as desired. The temperature of the etching solution is likewise typically from about 15° C. to about 90° C., in some embodiments from about 20° C. to about 80° C., and in some embodiments, from about 20° C. to about 75° C.

Once etched, the anode body may optionally be washed (e.g., in water) to remove any residual components. Thereafter, the anode body may be anodized so that a dielectric layer is created over and/or within the anode. Anodization is an electrochemical process by which the anode is oxidized to form a material having a relatively high dielectric constant. For example, a niobium oxide (NbO) anode may be anodized to form niobium pentoxide ($Nb_2O_5$). Typically, anodization is performed by initially applying an electrolyte to the anode, such as by dipping anode into the electrolyte. The electrolyte is generally in the form of a liquid, such as a solution (e.g., aqueous or non-aqueous).

The electrolyte is electrically conductive and may have an electrical conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the electrical conductivity of the electrolyte, a compound may be employed that is capable of dissociating in the solvent to form ions. Suitable ionic compounds may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired electrical conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte. A solvent, such as described above, is also generally employed in the electrolyte that functions as a carrier for the ionic compound, etc. The solvent may constitute from about 50 wt. % to about 99.9 wt. %, in some embodiments from about 75 wt. % to about 99 wt. %, and in some embodiments, from about 80 wt. % to about 95 wt. % of the electrolyte.

A current is passed through the electrolyte to form the dielectric layer. The value of voltage manages the passed charge (current multiplied by time) and thereby the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be synthesized on a surface of the anode and/or within its pores.

Once the dielectric layer is formed, a protective coating may optionally be applied, such as one made of a relatively insulative resinous material (natural or synthetic). Such materials may have a specific resistivity of greater than about 0.05 ohm-cm, in some embodiments greater than about 5, in some embodiments greater than about 1,000 ohm-cm, in some embodiments greater than about $1 \times 10^5$ ohm-cm, and in some embodiments, greater than about $1 \times 10^{10}$ ohm-cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming cathodes according to conventional techniques. In some embodiments, for example, the cathode is formed by various techniques, such as pyrolytic decomposition of manganese nitrate ($Mn(NO_3)_2$) to form a manganese dioxide ($MnO_2$) cathode. Such techniques are described, for instance, in U.S. Pat. No. 4,945,452 to Sturmer, et al., which is incorporated herein in its entirety by reference thereto for all purposes. Alternatively, a conductive polymer coating may be used to form the cathode of the capacitor. The conductive polymer coating may contain one or more polyheterocycles (e.g., polypyrroles; polythiophenes, poly(3,4-ethylenedioxythiophene) (PEDT); polyanilines); polyacetylenes; poly-p-phenylenes; polyphenolates; and derivatives thereof. Moreover, if desired, the conductive polymer coating may also be formed from multiple conductive polymer layers. For example, in one embodiment, the conductive polymer coating may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxythiophene) may initially be mixed with a polymerization catalyst to form a solution. For example, one suitable polymerization catalyst is BAYTRON C, which is iron III toluenesulfonate and sold by H. C. Starck. BAYTRON C is a commercially available catalyst for BAYTRON M, which is 3,4-ethylenedioxythiophene, a PEDT monomer also sold by H. C. Starck. Once a catalyst dispersion is formed, the anode part may then be dipped into the dispersion so that the polymer forms on the surface of the anode part. Alternatively, the catalyst and monomer(s) may also be applied separately to the anode part. In one embodiment, for example, the catalyst may be dissolved in a solvent (e.g., butanol) and then applied to the anode part as a dipping solution. The anode part may then be dried to remove the solvent therefrom. Thereafter, the anode part may be dipped into a solution containing the appropriate monomer. Once the monomer contacts the surface of the anode part containing the catalyst, it chemically polymerizes thereon. In addition, the catalyst (e.g., BAYTRON C) may also be mixed with the material(s) used to form the optional protective coating (e.g., resinous materials). In such instances, the anode part may then be dipped into a solution containing the monomer (BAYTRON M). As a result, the monomer can contact the catalyst within and/or on the surface of the protective coating and react therewith to form the conductive polymer coating. Although various methods have been described above, it should be understood that any other method for applying the conductive coating(s) to the anode part may also be utilized in the present invention. For example, other methods for applying such conductive polymer coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In most embodiments, once applied, the conductive polymer is healed. Healing may occur after each application of a conductive polymer layer or may occur after the application of the entire conductive polymer coating. In some embodiments, for example, the conductive polymer may be healed by dipping the pellet into an electrolyte solution, such as a solution of phosphoric acid and/or sulfuric acid, and thereafter applying a constant voltage to the solution until the current is reduced to a preselected level. If desired, such healing may be accomplished in multiple steps. For instance, in one embodiment, a pellet having a conductive polymer coating is first dipped in phosphoric acid and applied with about 20 volts and then dipped in sulfuric acid and applied with about 2 volts. In this embodiment, the use of the second low voltage sulfuric acid solution or toluenesulphonic acid can help increase capacitance and reduce the dissipation factor (DF) of the resulting capacitor. After application of some or all of the layers described above, the pellet may then be washed if desired to remove various byproducts, excess catalysts, and so forth. Further, in some instances, drying may be utilized after some or all of the dipping operations described above. For example, drying may be desired after applying the catalyst and/or after washing the pellet in order to open the pores of the pellet so that it can receive a liquid during subsequent dipping steps.

Once the cathode is formed, the part may optionally be applied with a carbon layer (e.g., graphite) and silver layer, respectively. The silver coating may, for instance, act as a solderable conductor, contact layer, and/or charge collector for the capacitor element and the carbon coating may limit contact of the silver coating with the solid electrolyte. Such coatings may cover some or all of the solid electrolyte.

Figure 2:
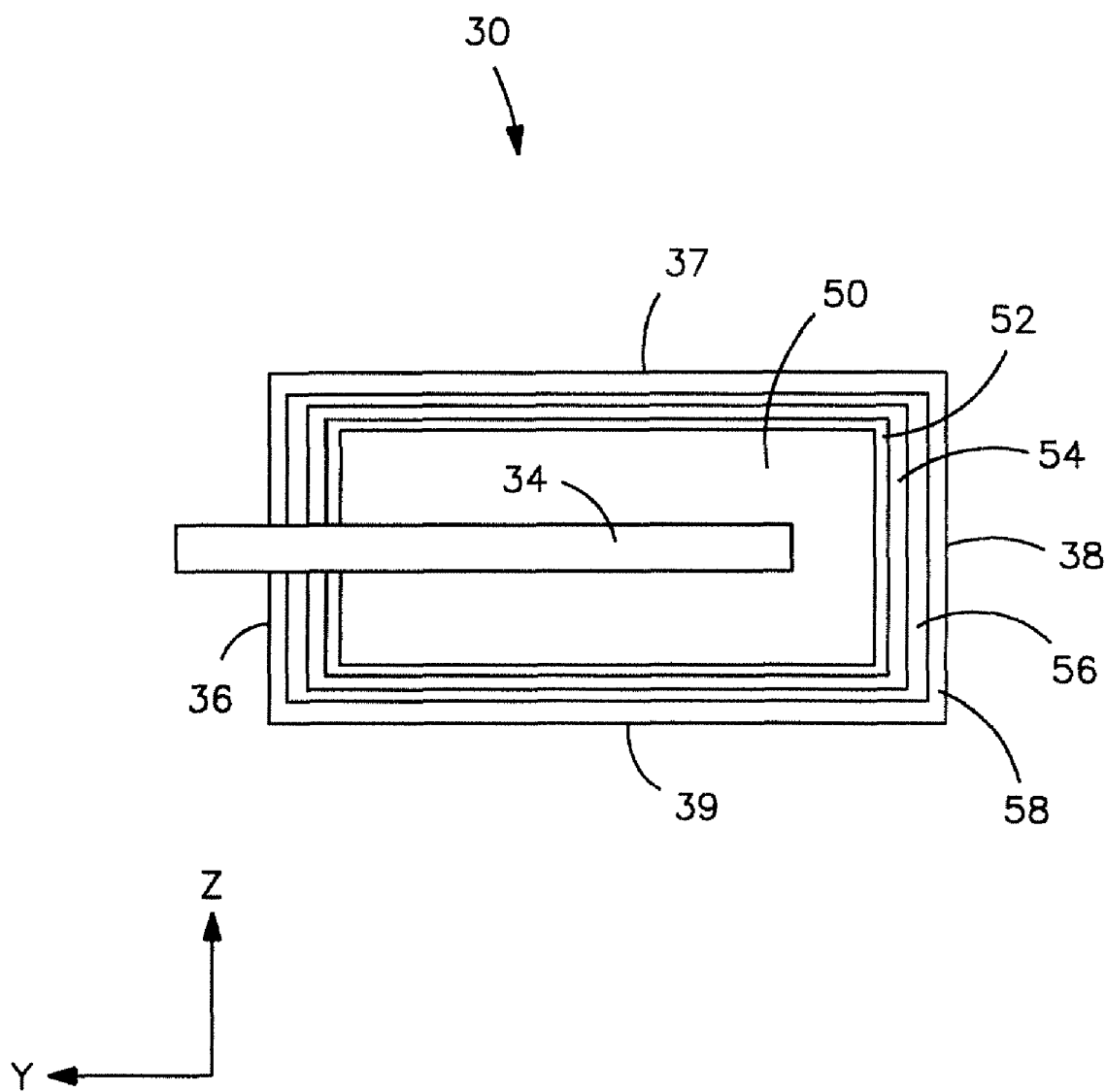
FIG. 2 is a cross-sectional view of the capacitor of FIG. 1.

The resulting capacitor element may then be terminated using techniques known in the art. Referring to FIGS. 1-2, for example, one embodiment of a capacitor element 30 is shown that has a generally rectangular shape and contains a front surface 36, rear surface 38, top and bottom surfaces 37 and 39, respectively, and side surfaces 32 (only one of which is illustrated). An anode wire 34 extends from the front surface 36 of the capacitor element 30 in a longitudinal direction ("y" direction). As further shown in FIG. 2, the capacitor element 30 contains an anode body 50, a dielectric layer 52 overlying the anode body 50, a solid electrolyte layer 54 overlying the dielectric layer 52, a graphite layer 56 overlying the organic solid electrolyte layer 54, and a silver layer 58 overlying the graphite layer 56. Of course, it should be understood that such layers may be applied to any surface of the capacitor, and need not be applied in the manner illustrated.

Figure 3:
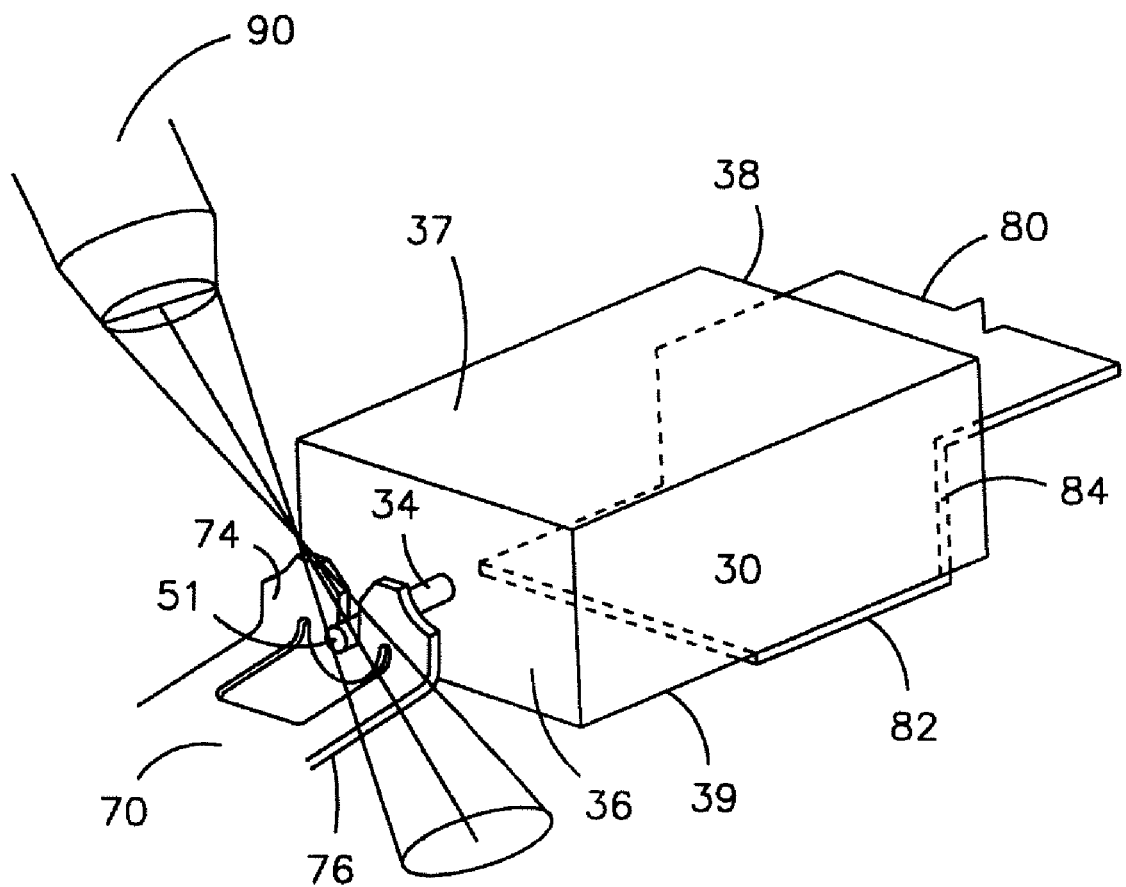
FIG. 3 is a schematic illustration of one embodiment of the present invention for laser welding a capacitor to an anode termination.

Upon formation of the capacitor element 30, anode and cathode termination may be electrically connected to the anode wire 34 and the solid electrolyte layer 54 (via the graphite and silver layers), respectively. The specific configuration of the terminations may vary as is well known in the art. Referring to FIG. 3, for example, one embodiment is shown that includes an anode termination 70 and a cathode termination 80. In this particular embodiment, the cathode termination contains a first portion 82 positioned substantially perpendicular to a second portion 84. The first portion 82 is in electrical contact with the lower surface 39 of the capacitor element 30 and the second portion 84 is in electrical contact with the rear surface 38 of the capacitor element 30. To attach the capacitor element 30 to the cathode termination 80, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

Figure 4:
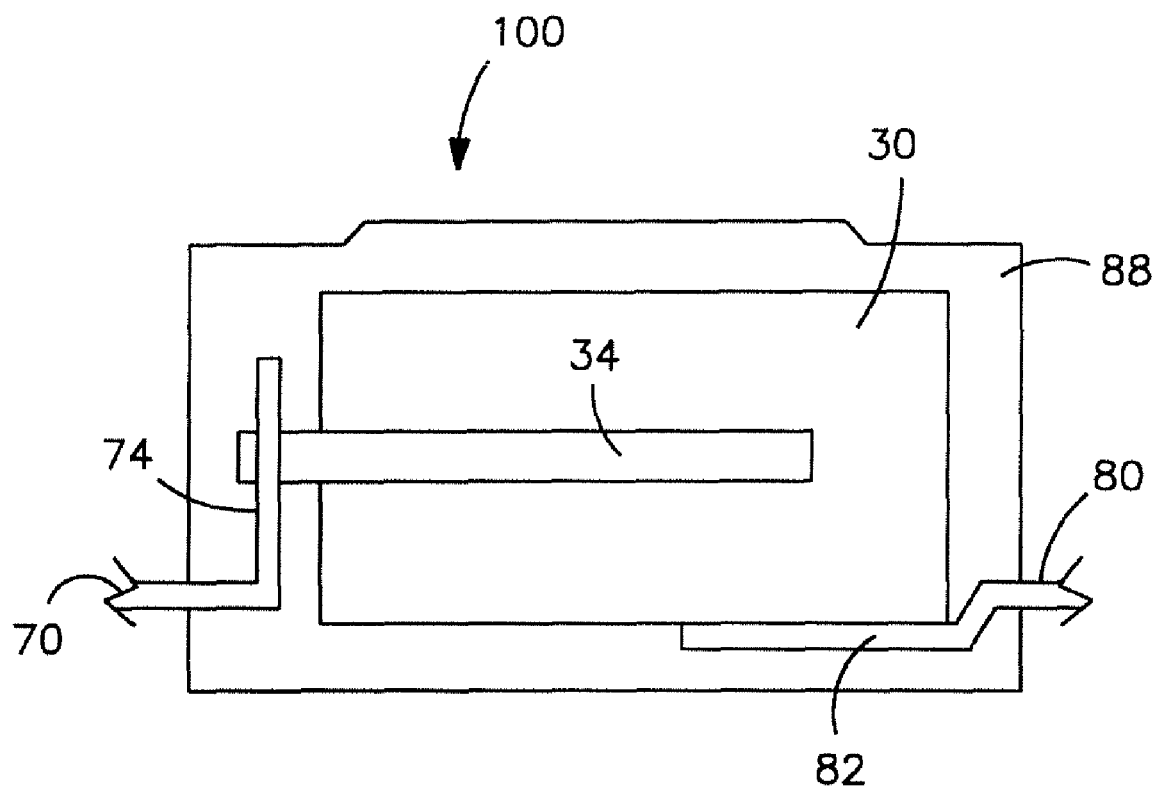
FIG. 4 is a cross-sectional view of a laser welded capacitor formed in accordance with one embodiment of the present invention.

The anode termination 70 contains a first portion 76 positioned substantially perpendicular to a second portion 74. The second portion 74 contains a region that carries the anode wire 34. In the illustrated embodiment, the region 51 possesses a "U-shape" for further enhancing surface contact and mechanical stability of the wire 34. The anode wire 34 is then welded to the region 51 with a laser 90. Once the capacitor element is attached to the terminations, it is enclosed within a resin casing, which may then be filled with silica-containing resin or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 0.1 to about 2.5 millimeters, and in some embodiments, from about 0.15 to about 2.0 millimeters. Suitable casings may include, for instance, "A", "B", "H", or "T" cases (AVX Corporation). Referring to FIG. 4, for example, one particular embodiment of such an encapsulating case for a capacitor assembly 100 is shown as element 88. The encapsulating case 88 provides additional structural and thermal protection for the capacitor assembly 100. After encapsulation, exposed portions of the respective anode and cathode terminations may be aged, screened, and trimmed. If desired, the exposed portions may be optionally bent twice along the outside of the casing 88 (e.g., at an approximately 90° angle).

As a result of the present invention, a capacitor may be formed that exhibits excellent electrical properties. For example, the capacitor of the present invention typically has an ESR less than about 1000 milliohms (mohms), in some embodiments less than about 500 mohms, and in some embodiments, less than about 100 mohms. The equivalent series resistance of a capacitor generally refers to the extent that the capacitor acts like a resistor when charging and discharging in an electronic circuit and is usually expressed as a resistance in series with the capacitor. In addition, the resulting leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 $\mu A/\mu F*V$, in some embodiments less than about 0.01 $\mu A/\mu F*V$, and in some embodiments, less than about 0.001 $\mu A/\mu F*V$, wherein $\mu A$ is microamps and uF*V is the product of the capacitance and the rated voltage. Likewise, the breakdown voltage of the capacitor of the present invention may be at least about 10 volts, in some embodiments at least about 15 volts, in some embodiments at least about 20 volts, and in some embodiments, from about 20 volts to about 100 volts.

The present invention may be better understood by reference to the following examples.

Test Procedures

VA Characteristics

The V-A characteristics of a capacitor were measured with a series resistance 100 mohms. The applied voltage was gradually increased by a bipolar power supply (Keithley 2400) in increments of 0.1 V and the current was measured by a digital multimeter (Agilent 34401) at a temperature of 25° C. after 10 s delay.

Reflow/Pressure Cooker/Reflow Stability

To test the current stability at high temperatures, the anodes were heated according to a reflow temperature profile (preheat at a max of 180° C., peak of 250° C. to 255° C., and a reflow gradient of 3.75 to 4.25° C. per second) using the reflow oven Heller and in a pressure cooker (120° C., 100% humidity). More specifically, the anodes were first heated according to the reflow profile, then heated in the pressure cooker for 2 hours, and finally heated according to the reflow profile once again. The leakage current was measured using power supply Hewlett Packard HP6634A and MC157 Leakage test set made by Mantracourt Electronics LTD, UK, before and after the whole procedure at ambient temperature 25° C. after 20 seconds.

Example 1

Figure 5:
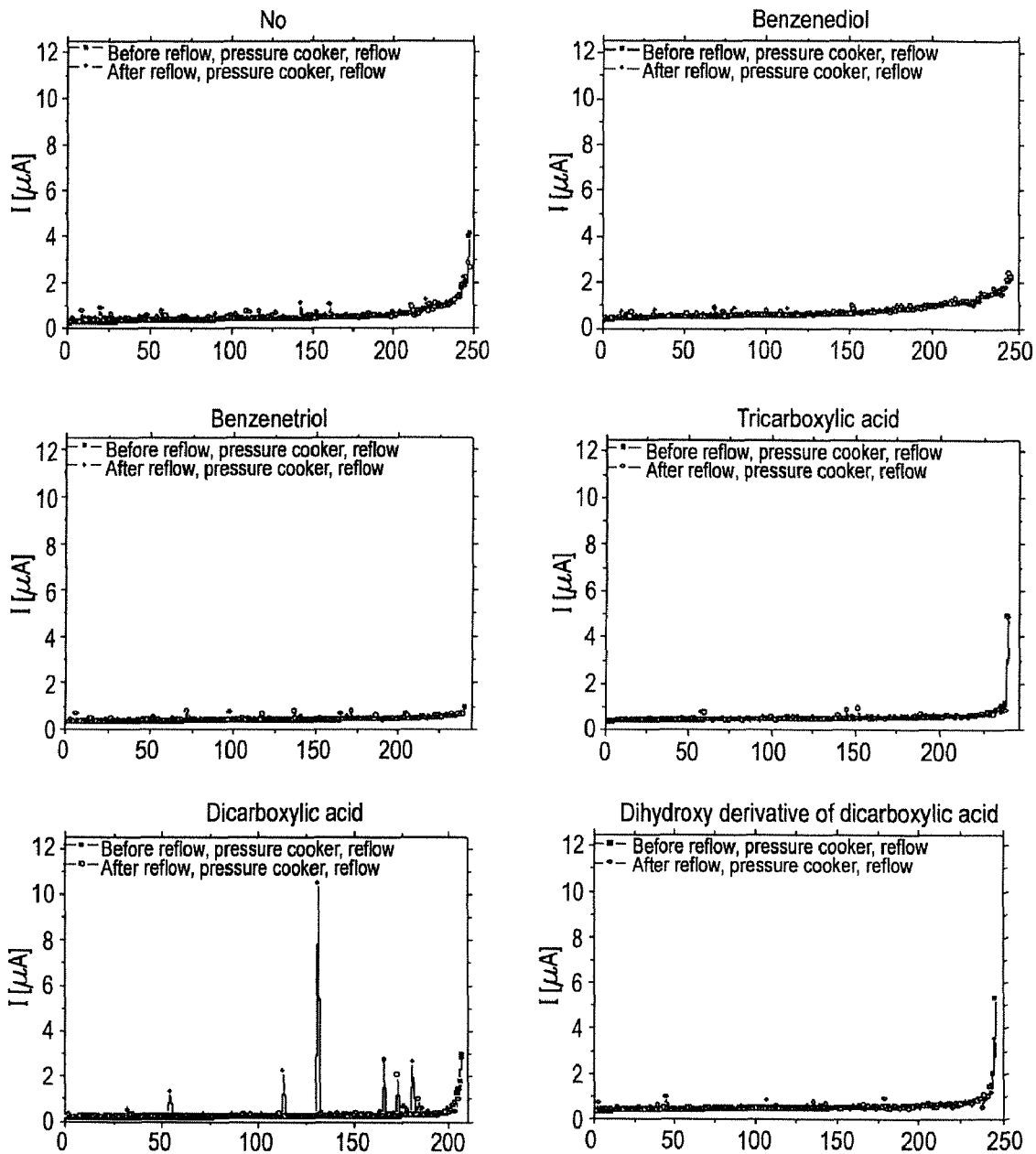
FIG. 5 is a graphical depiction of the leakage currently stability achieved for the samples of Example 1.
Figure 6:
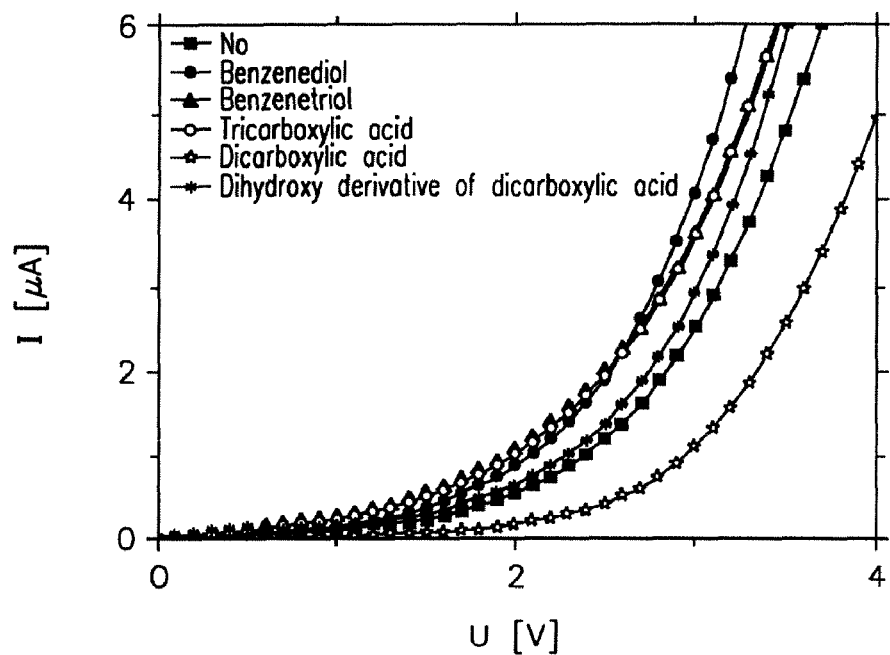
FIG. 6 is a graphical depiction of the V-A results obtained in Example 1.

80,000 $\mu FV/g$ niobium oxide powder (H C Starck) was pressed into pellets and sintered to form a porous electrode body. The pellets were then treated for 1 hour in various solutions of weak organic acids, i.e., benzenediol (1 wt. %, room temperature), benzenetriol (1 wt. %, room temperature), tricarboxylic acid (1 wt. %, 70° C.), dicarboxylic acid (1 wt. %, 70° C.), and a dihydroxy derivative of a dicarboxylic acid (1 wt. %, 70° C.). Anodic oxidation was then carried out in an aqueous solution containing phosphoric acid at ambient temperature. The anodic oxidation was done first galvanostatically to the desired voltage and then potentiostatically. The conductivity of the electrolyte with supporting electrolyte was 4.5 mS/cm. The voltage was chosen to obtain a targeted capacitance of 100 $\mu F$. After anodic oxidation, the pellets were coated with a manganese dioxide layer, a graphite coating and a silver coating. The finished parts were completed by conventional assembly technology to the B case (EIA 3528). The current stability was measured as described above. The results are shown in FIG. 5. The V-A characteristics of the aged capacitors were also measured. The results are shown in FIG. 6.

Example 2

Figure 7:
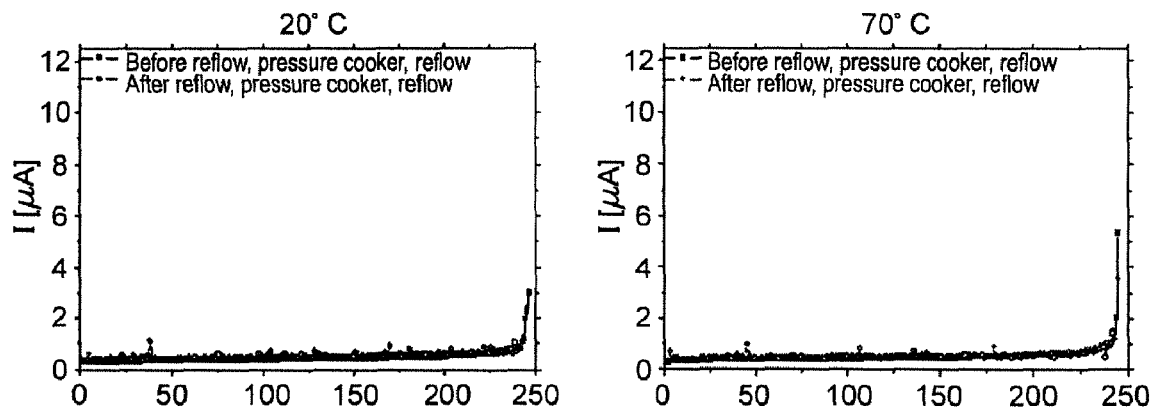
FIG. 7 is a graphical depiction of the leakage currently stability achieved for the samples of Example 2.
Figure 8:
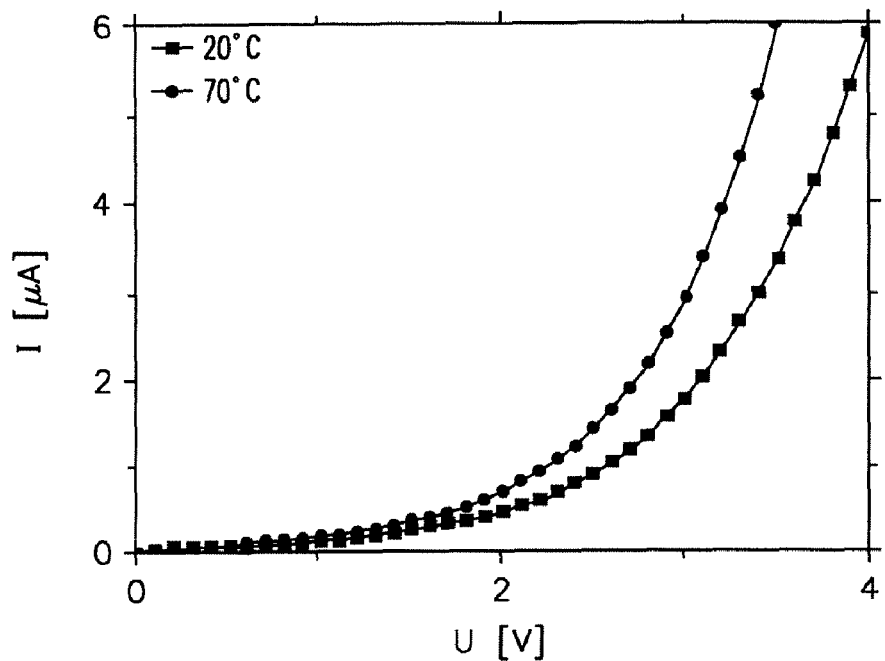
FIG. 8 is a graphical depiction of the V-A results obtained in Example 2.

80,000 $\mu FV/g$ niobium oxide powder (H C Starck) was pressed into pellets and sintered to form a porous electrode body. The pellets were then treated for 1 hour in an aqueous solution of a dihydroxy derivative of a dicarboxylic acid (1 wt. %) at various temperatures. Anodic oxidation was then carried out as described in Example 1. After anodic oxidation, the pellets were coated with a manganese dioxide layer, a graphite coating and a silver coating. The finished parts were completed by conventional assembly technology to the B case (EIA 3528). The anodes were then heated and tested as described above. The leakage current results are shown in FIG. 7 and the V-A characteristics of the capacitors are shown in FIG. 8.

Example 3

Figure 9:
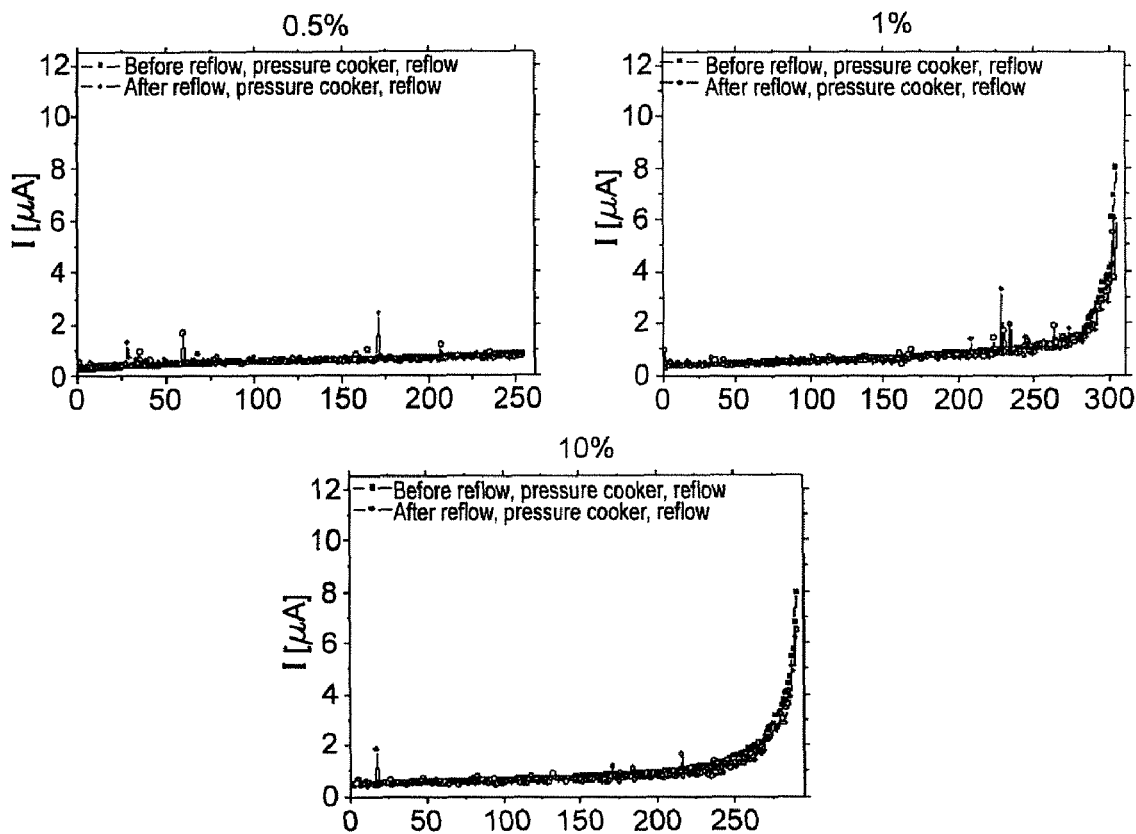
FIG. 9 is a graphical depiction of the leakage currently stability achieved for the samples of Example 3.
Figure 10:
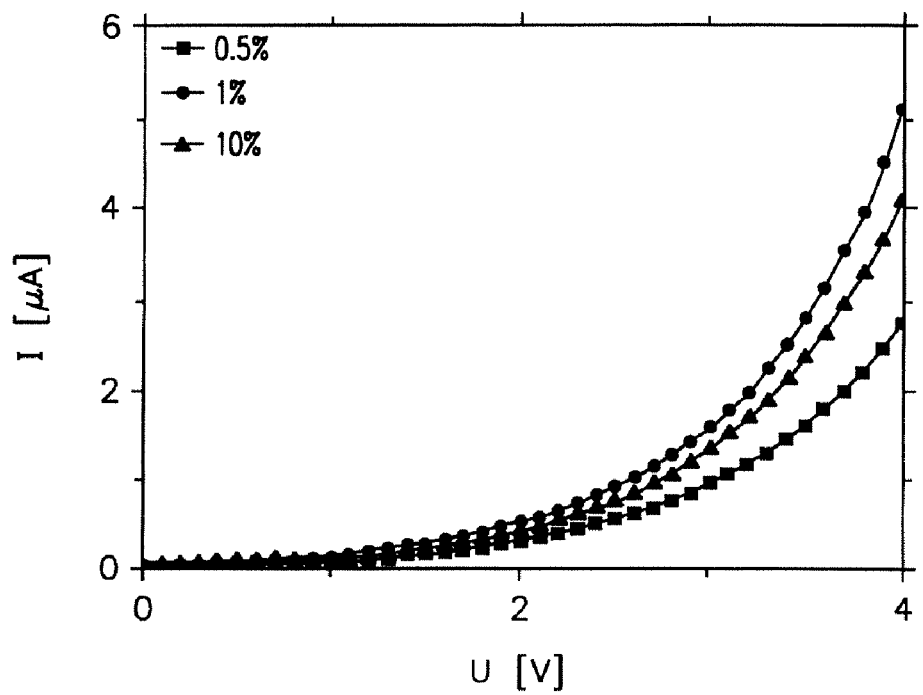
FIG. 10 is a graphical depiction of the V-A results obtained in Example 3.

80,000 $\mu FV/g$ niobium oxide powder (H C Starck) was pressed into pellets and sintered to form a porous electrode body. The pellets were then treated for 1 hour in an aqueous solution of dicarboxylic acid (70° C.) at various concentrations. Anodic oxidation was then carried out as described in Example 1. After anodic oxidation, the pellets were coated with a manganese dioxide layer, a graphite coating and a silver coating. The finished parts were completed by conventional assembly technology to the B case (EIA 3528). The anodes were then heated and tested as described above. The leakage current results are shown in FIG. 9 and the V-A characteristics of the capacitors are shown in FIG. 10.

Example 4

Figure 11:
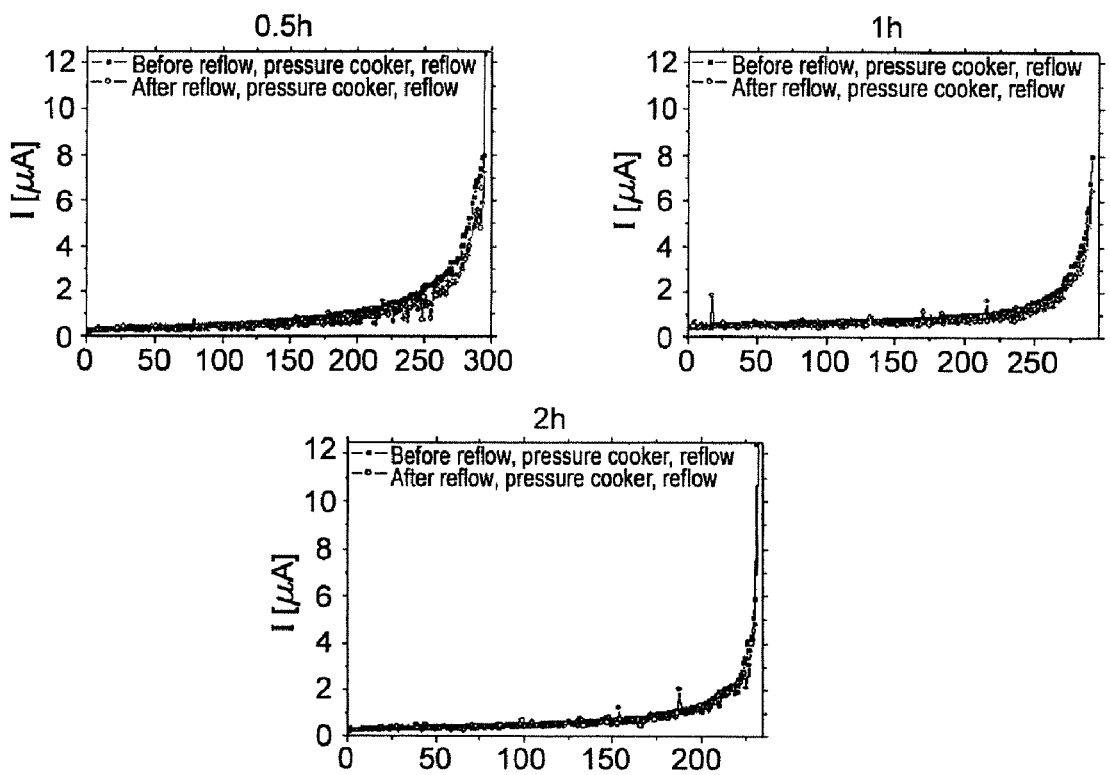
FIG. 11 is a graphical depiction of the leakage currently stability achieved for the samples of Example 4.
Figure 12:
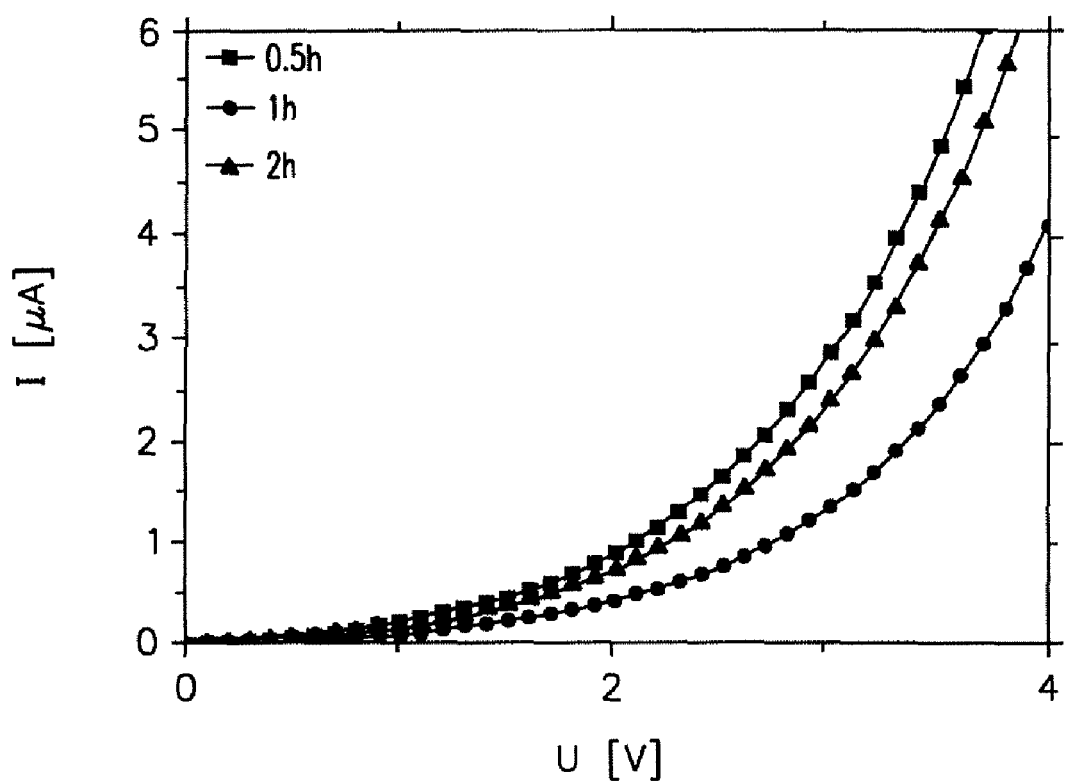
FIG. 12 is a graphical depiction of the V-A results obtained in Example 4.

80,000 $\mu FV/g$ niobium oxide powder (H C Starck) was pressed into pellets and sintered to form a porous electrode body. The pellets were then treated in an aqueous solution of dicarboxylic acid (10 wt. %, ambient temperature) for various amounts of time. Anodic oxidation was then carried out as described in Example 1. After anodic oxidation, the pellets were coated with a manganese dioxide layer, a graphite coating and a silver coating. The finished parts were completed by conventional assembly technology to the B case (EIA 3528). The anodes were then heated and tested as described above. The leakage current results are shown in FIG. 11 and the V-A characteristics of the capacitors are shown in FIG. 12.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming an anode of an electrolytic capacitor, the method comprising:
    compacting a powder that contains a valve metal composition into a pressed pellet, wherein the valve metal composition contains an electrically conductive oxide of tantalum or niobium;
    sintering the pressed pellet to form an anode body;
    etching the anode body with an organic polyprotic acid having a first acid dissociation constant ranging from 0 to about 11, as determined at a temperature of 25° C.; and
    thereafter, anodically oxidizing the etched anode body in the presence of an electrolyte to form a dielectric layer.

2. The method of claim 1, wherein the first acid dissociation constant ranges from about 2 to about 10.

3. The method of claim 1, wherein the polyprotic acid is a carboxylic acid.

4. The method of claim 3, wherein the carboxylic acid includes α-tartaric acid, meso-tartaric acid, oxalic acid, citric acid, or a combination thereof.

5. The method of claim 1, wherein the acid is a pyrogallol, pyrocatechol, or a combination thereof.

6. The method of claim 1, wherein the organic acid is contained within an etching solution.

7. The method of claim 6, wherein the etching solution has a pH of about 2 to about 12.

8. The method of claim 6, wherein organic acids constitute from about 0.1 wt. % to about 20 wt. % of the etching solution.

9. The method of claim 6, wherein organic acids constitute from about 0.5 wt. % to about 10 wt. % of the etching solution.

10. The method of claim 6, wherein the etching solution has a temperature of from about 20° C. to about 75° C.

11. The method of claim 6, wherein the anode body is dipped into the etching solution.

12. The method of claim 1, wherein the anode body is dipped into the electrolyte.

13. The method of claim 1, wherein the valve metal composition contains an oxide of niobium having an atomic ratio of niobium to oxygen of 1:1.0±0.3.

14. The method of claim 1, wherein the valve metal composition contains an oxide of niobium having an atomic ratio of niobium to oxygen of 1:1.0±0.1.

15. A capacitor anode formed according to the method of claim 1.

16. A solid electrolytic capacitor comprising the capacitor anode of claim 15, further comprising a solid electrolyte layer overlying the dielectric layer.

17. The method of claim 1, wherein etching provides the anode body with a substantially uniform surface.

18. The method of claim 17, wherein the dielectric layer has a substantially uniform thickness and a substantially homogeneous amorphous structure.

19. The method of claim 1, wherein the powder has a specific charge of about 60,000 microFarads*Volts per gram or more.

20. A solid electrolytic capacitor comprising:
    a sintered, pressed anode pellet containing an electrically conductive oxide of tantalum or niobium, wherein the anode pellet possesses a surface etched with an organic polyprotic acid having a first acid dissociation constant ranging from 0 to about 11, as determined at a temperature of 25° C.;
    a dielectric layer overlying the etched surface of the anode pellet; and
    a solid electrolyte layer overlying the dielectric layer.

21. The solid electrolytic capacitor of claim 20, wherein the anode body contains an oxide of niobium having an atomic ratio of niobium to oxygen of 1:1.0±0.3.

22. The solid electrolytic capacitor of claim 20, wherein the anode body contains an oxide of niobium having an atomic ratio of niobium to oxygen of 1:1.0±0.1.

23. The solid electrolytic capacitor of claim 20, further comprising at least additional layer that overlies the electrolyte layer, the additional layer including a carbon layer, silver layer, or a combination thereof.

24. The solid electrolytic capacitor of claim 20, further comprising an anode lead that extends from the anode body.

25. The solid electrolytic capacitor of claim 24, further comprising:
    a cathode termination that is in electrical communication with the electrolyte layer;
    an anode termination that is in electrical communication with the anode body; and
    a case that encapsulates the capacitor and leaves at least a portion of the anode and cathode terminations exposed.

26. The solid electrolytic capacitor of claim 20, wherein the solid electrolyte layer contains a conductive polymer.

27. The solid electrolytic capacitor of claim 20, wherein the solid electrolyte layer contains manganese dioxide.

28. The solid electrolytic capacitor of claim 20, wherein the etched anode pellet has a substantially uniform surface.

29. The solid electrolytic capacitor of claim 28, wherein the dielectric layer has a substantially uniform thickness and a substantially homogeneous amorphous structure.

30. The solid electrolytic capacitor of claim 20, wherein the pellet is formed from a powder having a specific charge of about 60,000 microFarads*Volts per gram or more.

* * * * *